(12) United States Patent
Swart et al.

(10) Patent No.: US 6,557,333 B2
(45) Date of Patent: May 6, 2003

(54) MATERIAL COLLECTOR MOUNTING SYSTEM

(75) Inventors: Benjamin J. Swart, Germantown, WI (US); Randy E. Benway, Horicon, WI (US)

(73) Assignee: Deere & Company, Moline, IL (US)

( * ) Notice: Subject to any disclaimer, the term of this patent is extended or adjusted under 35 U.S.C. 154(b) by 6 days.

(21) Appl. No.: 09/901,925

(22) Filed: Jul. 10, 2001

(65) Prior Publication Data

US 2003/0010006 A1 Jan. 16, 2003

(51) Int. Cl.$^7$ ............................................... A01D 61/00
(52) U.S. Cl. ........................................ 56/16.6; 56/202
(58) Field of Search ..................... 56/202, 16.6, 203, 56/205, 194, 320.2, DIG. 9

(56) References Cited

U.S. PATENT DOCUMENTS

| | | | | |
|---|---|---|---|---|
| 3,893,284 A | * | 7/1975 | Thon et al. .................. | 56/202 |
| 3,949,540 A | * | 4/1976 | Christopherson et al. ..... | 56/202 |
| 4,043,102 A | * | 8/1977 | Uhlinger et al. ............. | 56/17.4 |
| 4,110,869 A | * | 9/1978 | Hastings ..................... | 16/437 |
| 4,214,424 A | * | 7/1980 | Gobin ........................ | 56/16.6 |
| 4,238,918 A | * | 12/1980 | Saruhashi et al. .......... | 114/116 |
| 4,522,019 A | * | 6/1985 | Edwards et al. ............ | 56/16.6 |
| 4,800,712 A | * | 1/1989 | Morse et al. ............... | 56/16.6 |
| 6,012,273 A | * | 1/2000 | Ogasawara et al. ......... | 56/16.6 |

OTHER PUBLICATIONS

Operator's Manual—John Deere Worldwide Commercial and Consumer Equipment Division OMM12247 H8, see p. 12. Copyright Dated 1998.

* cited by examiner

Primary Examiner—Robert E. Pezzuto
Assistant Examiner—Árpád Fábián Kovács

(57) ABSTRACT

A system for mounting material collector containers to lawn and garden tractors includes mounting arms pivotally attachable to the tractor frame and spring biased latching device connected to the arms for releasably and automatically latching the arms to the frame in a given pivotal position. The mounting bracket system is arranged so as to be latched to and receive vertical support from a location or locations remote from the hitch plate and hitch hole. Thus, the mounting bracket system does not interfere with the normal intended uses of the hitch plate and hitch hole.

21 Claims, 3 Drawing Sheets

MATERIAL COLLECTOR MOUNTING SYSTEM

BACKGROUND OF INVENTION

1) Field of Invention

The present invention relates generally to lawn and garden tractors and, more specifically, to a device for mounting material collector containers or bagger attachments to the rear of such tractors.

2) Related Art

Heretofore material collector containers or bagger attachments have been mounted to the rear of lawn and garden tractors by the semi-permanent attachment of a load carrying mounting bracket structure to the vehicle frame. The mounting bracket structure typically includes an H-shape bracket supported vertically by a support plate that extends horizontally, substantially covering and resting on the hitch plate of the vehicle. A clevis pin inserts through the hole in the hitch plate and a hole in the support plate, thus blocking the hitch hole and making it unavailable for its normal intended uses. Consequently, carts, implements, and other attachments cannot be towed behind the tractor while the bagger attachment is so mounted. Thus, there is a need for an improved mounting bracket structure that does not interfere with the hitch hole or the hitching function.

BRIEF SUMMARY OF THE INVENTION

It is therefore an object of the present invention to provide an improved system for mounting material collector bags or containers on a lawn and garden tractor.

It is a further object to provide a mounting system that does not rely on the hitch plate for support and does not block the hitch hole or interfere with the hitching function.

It is another object to provide an improved mounting system that utilizes a bracket that pivotally mounts and releasably latches to vertical walls of the tractor frame remote from the hitch hole.

It is another object to provide an improved mounting system that is spring-biased into a latched position once pivoted into said latched position.

It is a further object to provide an improved mounting system that can be quickly and easily installed and removed from the tractor frame, preferably as a single integral unit.

It is another object to provide an improved mounting system that is capable of automatically latching and securely retaining itself in a latched position on the tractor frame.

The material collector mounting system of this invention includes a pair of laterally spaced mounting arms having forward portions adapted to pivotally mount on the rear portion of the tractor frame and a spring biased pivotal latching mechanism for automatically latching the mounting arms in a desired pivotal position once that position is achieved. The latching mechanism includes at least one latch hook pivotally connected to the mounting arms and having a hook-shaped forward portion. Preferably a pair of latch hooks and a pair of springs are utilized and connected to the mounting arms respectively. The latch hooks are arranged so that they do not interfere with the hitching function.

DESCRIPTION OF THE PREFERRED EMBODIMENT

Figure 1:
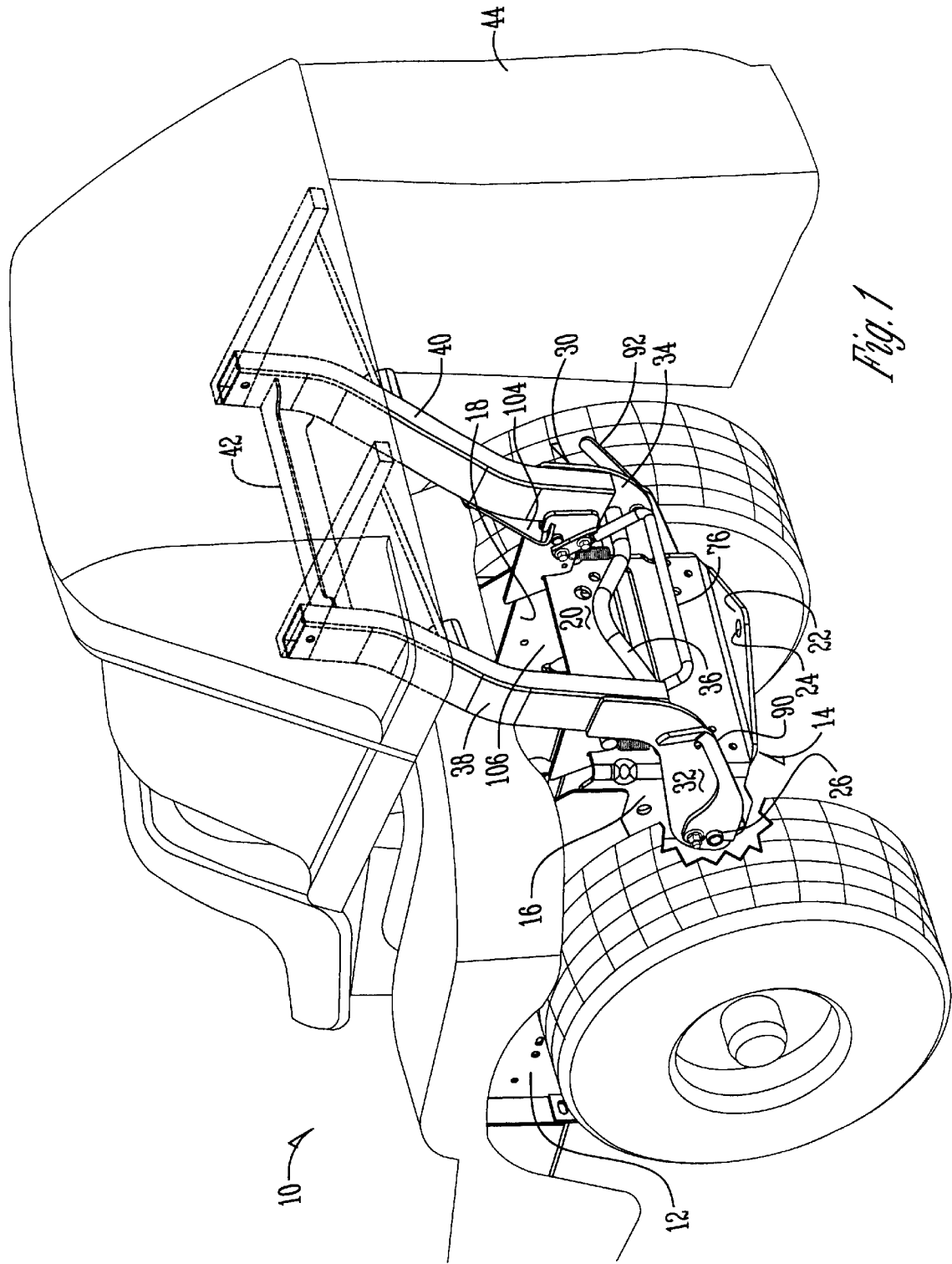
FIG. 1 is a perspective view of the rear of a lawn and garden tractor equipped with a mounting bracket structure for attaching material collection containers or bags according to the present invention.

Referring to FIG. 1, a lawn and garden tractor or similar vehicle 10 has a main frame 12 that includes a rear portion 14. The rear portion 14 includes substantially upright, laterally spaced left and right walls 16, 18 interconnected by a substantially upright rear wall 20. A generally horizontal triangular hitch plate 22 extends from the bottom of the rear wall 20, as is conventional. A round hitch hole 24 extends vertically through the hitch plate 22 adjacent its rear edge. Pivot pins or studs 26, 28 attach in a cantilevered manner to the frame 12 and extend horizontally outward at similar locations on the left and right upright walls 16, 18 respectively (the pivot pin 28 is hidden from view by the frame). The coaxial pivot pins 26, 28 define a main pivot axis of the system 30.

Figure 2:
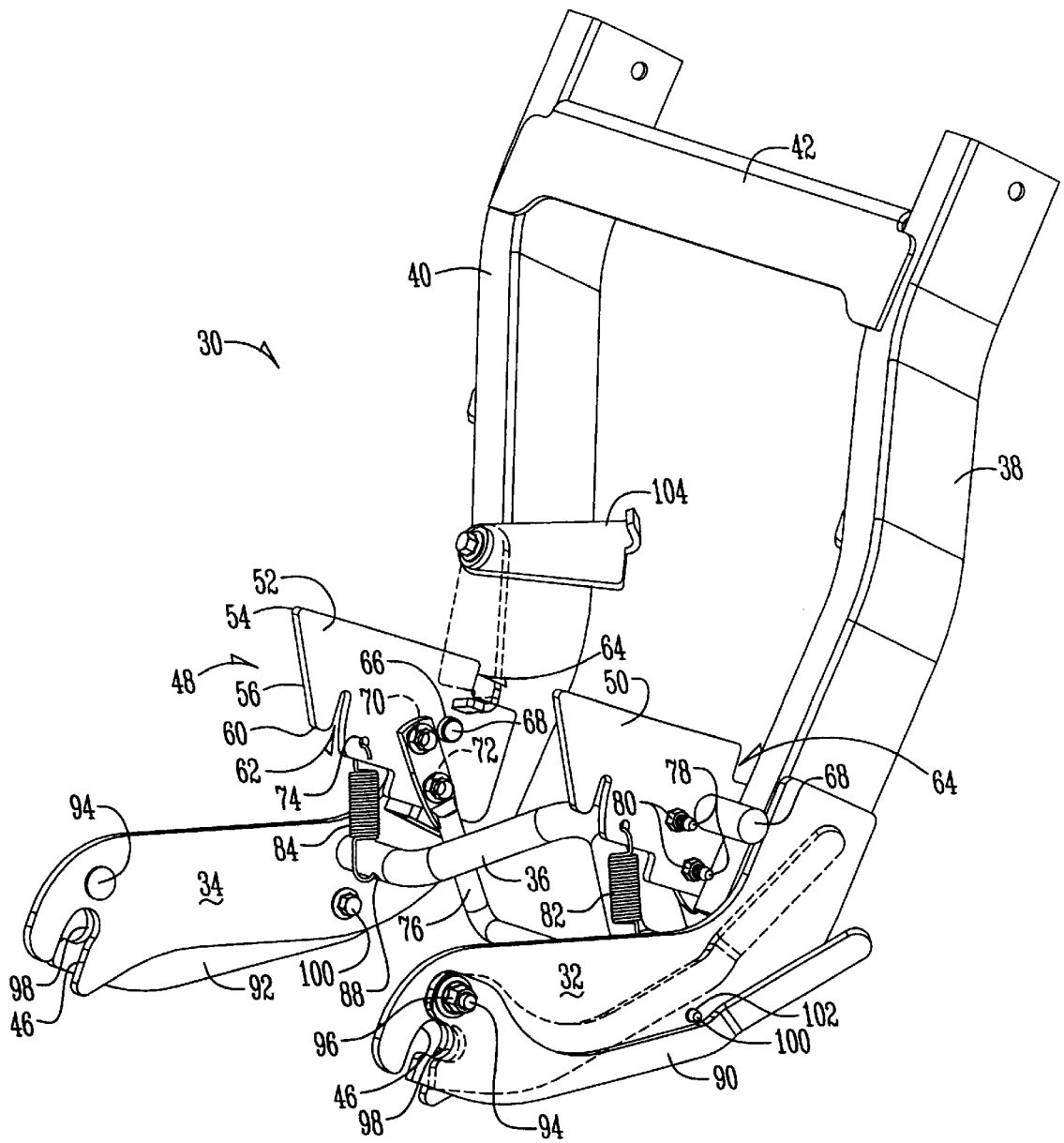
FIG. 2 is a perspective view of the mounting bracket structure of FIG. 1.

Referring to FIGS. 1 and 2 the material collector mounting system 30 of this invention includes a pair of laterally spaced mounting arms 32, 34 each having a forward and rear portion. The rear portions of the mounting arms 32, 34 are rigidly connected together by a lateral cross member 36 so that they move in unison. The cross member 36 has a central portion that bends or curves rearwardly. A pair of laterally spaced, elongated, generally upright support legs 38, 40 is provided. The lower portions of the support legs 38, 40 are rigidly attached to the rear portions of the mounting arms 32, 34 by welding or another suitable conventional method. The upper portions of the support legs 38, 40 are rigidly connected together by a cross brace 42, which provides the desired spacing and rigidity. The support legs 38, 40 and the cross brace 42 together define an H-shaped subframe. A conventional set of three material collection bags 44 or containers are suspended from the H-shaped subframe. Since the bags 44 themselves are not the subject of this invention, only one of the bags 44 is shown in FIG. 1.

The mounting arms 32, 34 are preferably identical and are constructed so as to include a substantially flat plate having an L-shaped profile overall. The elongated portion of the L-shaped profile constitutes the forward portion of each mounting arm 32, 34 and the truncated portion of the L-shaped profile constitutes the rear portion of each mounting arm 32, 34. The forward portion of each mounting arm 32, 34 pivotally connects to the frame 12. The forward portion of each mounting arm 32, 34 has an opening 46 that is adapted to receive one of the pivot pins 26, 28. For ease of removing the mounting arms 32, 34 from the pins, the opening 46 is preferably a generally U-shaped slot that extends completely through the thickness of the plate that forms the mounting arm 32 or 34. Although other orientations of the slot are possible without detracting from the invention, the slot defining the opening 46 preferably has a mouth that is directed generally downwardly or substantially parallel to the rear portion of the mounting arm 32, 34.

The material collection system 30 includes torsionally spring biased latching means 48 thereon for automatically and releasably latching the mounting arms 32, 34 and the H-shaped subframe to the rear portion 14 of the tractor frame 12 as an integral unit. The latching means 48 includes at least one latch hook pivotally connected to one of the mounting arms 32, 34 and laterally offset from the hitch hole 24 far enough to provide adequate clearance for the insertion of a conventional hitch clevis pin in the hitch hole. More preferably, the latching means 48 includes a pair of laterally spaced latch hooks 50, 52 similarly offset. The latch hooks 50, 52 have rear portions thereof pivotally connected to the rear portions of the mounting arms 32, 34 respectively. Each latch hook 50, 52 includes a hook-shaped forward portion adapted to selectively engage and hook onto the rear wall 20 of the tractor frame 12. Thus, the system 30 is vertically supported by the rear portion 14 of the lawn and garden tractor frame 12 at a location remote from the hitch plate 22 and hitch hole 24.

The latch hooks 50, 52 are preferably formed of substantially flat plates. The forward end of the plate has a blunt point 54 thereon. The plate has an angled edge 56 that extends rearwardly and downwardly from the blunt point 54 and connects to a curved edge 58 that is raised above a lower edge 60 of the plate. A vertically elongated slot 62 resides between the curved edge 58 and the lower edge 60, as best seen in FIG. 2. For reasons that will become apparent later, the upper rear corner of the plate has a notch 64 therein.

Each of the latch hooks 50, 52 includes a hole 66 for receiving a pivot shaft 68. The pivot shaft 68 is welded to the respective support legs 38, 40 and/or mounting arms 32, 34. The pivot shafts 68 protrude laterally into the space between the support legs 38, 40. The coaxial pivot shafts 68 define a latch pivot axis that is offset from the parallel to the main pivot axis. Holes 70, 72 and 74 are provided in the latch hooks 50, 52 as shown in FIG. 2. A rigid latch hook cross bar 76 rigidly interconnects the latch hooks 50, 52 so that they pivot in unison about the pivot shafts 68. The cross bar 76 is secured to the latch hooks 50, 52 by a pair of bolts 78 that insert in the holes 70, 72. Nuts 80 are then installed on the bolts 78. In the alternative, self-tapping screws 78 can be used and the nuts 80 can be omitted. The lower bolts 78 and/or the bolt-and-nut combinations 78, 80 act as stop members for limiting the downward pivotal movement of the latch hooks 50, 52 so that they will tend to pivot upwardly and rearwardly when they strike the rear wall 20 on the frame 12.

The hole 74 is located between the hole 66 for the pivot shaft 68 and the slot 62. Spring biasing means in the form of a pair of coiled tension springs 82, 84 interconnect the cross member 36 and the respective latch hooks 50, 52. One end of the spring 80 or 82 is attached to a hole 86 in the cross member 36 adjacent the respective mounting arm. The other end of the spring 82, or 84 is inserted into the hole 74 in the respective latch hook 50 or 52 located thereabove. Thus, the springs 82, 84 each operatively connect one of the latch hooks 50, 52 to one of the mounting arms 32, 34 so as to yieldingly bias the latch hooks for pivotal movement into a latching or latched position.

The material collector system 30 further includes lower swing latches 90, 92 pivotally connected to the forward portions of the mounting arms 32, 34 respectively. A threaded stud 94 and a nut 96 provide the pivotal connection at a location upwardly adjacent of the opening 46 in the mounting arm 32 or 34. The forward end of each of the lower swing latches 90, 92 has an approximately semi-circular opening 98 therein for receiving one of the pivot pins 26 or 28 and retaining the same in cooperation with the sidewalls of the opening 46. Like the mounting arms 32, 34, the lower swing latches 90, 92 are preferably formed from a substantially flat plate. The rear portion of the swing latches 90, 92 constitutes a handle. The handle portion flares outwardly from the rest of the swing latch so that the handle portion is easily accessible to the user. A bolt 100 installs in a threaded hole 102 in the central portion of each of the mounting arms 32, 34. A portion of the bolt 100 protrudes laterally outward from the central portion of the mounting arms 32, 34 and constitutes a stop member for limiting the movement of the lower swing latches 90, 92, as best understood in view of FIG. 2.

Because the swing latches 90, 92 are constructed as elongated, relatively thin plates, they exhibit some inherent flexibility in a direction transverse to their length. Thus, each swing latch 90, 92 is bendable outwardly from the adjacent mounting arm 32, 34 so as to clear the stop member 100 when desired. The user merely forces the handle portion of the swing latch 90, 92 laterally outward until the latch 90, 92 can pivot without striking the stop member 100.

A security latch 104 pivotally mounts to one of the support legs 40 above the latch hook 52. The security latch 104 has a free end adapted to mate with the latch hook 52 at the notch 64 so as to prevent the latch hook 52 from rotating rearwardly and upwardly about the pivot shaft 68. Thus, the latch 104 prevents the latch hook 52 from inadvertently being unhooked or unlatched from the tractor frame 12.

To construct and assemble the material collection system 30 the mounting arms 32, 34 are attached by welding or other suitable means to the support legs 38, 40 respectively. The pivot shafts 68 are welded to the support legs 38, 40 and/or the mounting arms 32, 34. Cross member 36 and cross brace 42 are attached to join the left and right sides of the system 30 together. The latch hooks 50, 52 are installed on the pivot shafts 68. Then the latch hook cross bar 76 can be attached to the latch hooks 50, 52 to keep them in place on the pivotable shafts 68. The ends of the springs 82, 84 are connected to the cross member 36 and the respective latch hooks 50, 52. If it has not already been done, the stop members 100 and lower swing latches 90, 92 are attached to the respective mounting arms 32, 34.

Figure 3:
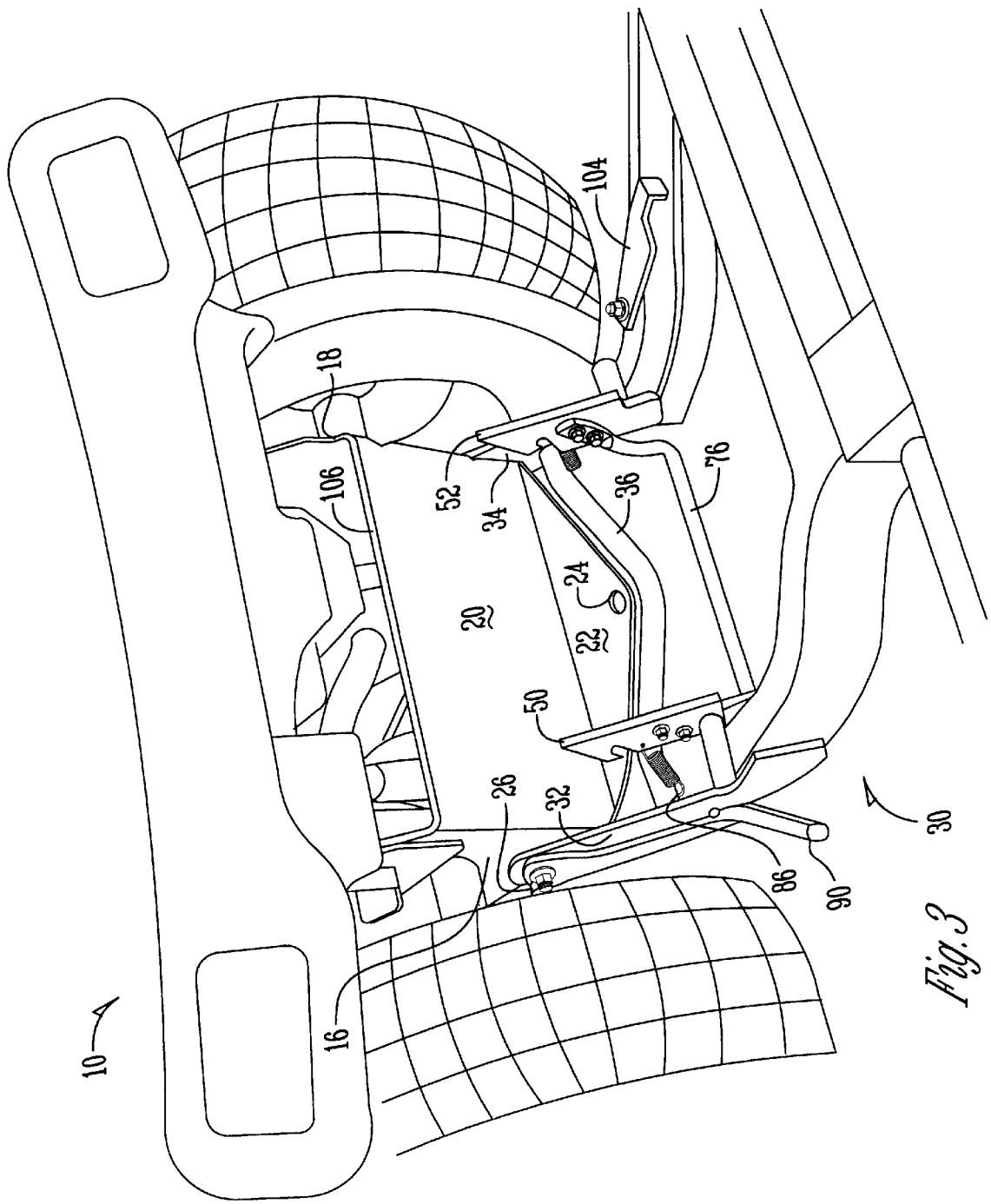
FIG. 3 is a perspective view of the mounting bracket structure of this invention in its unlocked and lowered position, such as for installation or removal.

The user forces the lower swing latches 90, 92 laterally outwardly at the handle portion so that the latch clears the stop members 100. The lower swing latches 90, 92 are set in the pivotally retracted position shown by dash lines in FIG. 2. The mounting arms 32, 34 of the collector system 30 can then be installed over the pivot pins 26, 28 by sliding the pins into the openings 46. Once the mounting arms 32, 34 are pivotally installed on the pins 26, 28, the lower swing latches 90, 92 are forced laterally outward and pivoted over the stop members 100 into the retaining position shown by solid lines in FIG. 2. The material collector system 30 will then rest in the lower position, as best seen in FIG. 3. The user pivots the security latch 104 out of engagement with the latch hook 52. The user then raises or pivots the collector system 30 upwardly about the main pivot axis defined by the pins 26, 28 and toward the rear portion 14 of the frame 12. As a result of the orientation of the blunt point 54 and the angled edge 56 of the latch hooks 50, 52, the latch hooks 50, 52 are urged to pivot upwardly and rearwardly when they hit the rear wall 20 of the frame 12. As the user continues to pivot the mounting arms 32, 34. of the collector system 30 toward the tractor frame 12, the upper edge 106 of the rear wall slides around the curved edge 58 and the latch hooks 50, 52 are automatically drawn downward by the springs 82, 84 so that the upper edge 106 of the rear wall 20 is securely positioned in the slots 62. Thus, the material collector system 30 is pivotally attached to and spring-biased so as to latch automatically with the tractor frame 12. The collector system 30 receives its vertical support and radial timing from the rear wall 20 of the tractor 10 at one or more points offset from the hitch plate 22 and the hitch hole 24.

Once the latch hooks 50, 52 latch to the rear wall 20, the security latch 104 is pivoted into its locking position, shown by the dashed lines in FIG. 2. This prevents the inadvertent releasing of the latched hooks 50, 52 from the frame 12 of the tractor.

To remove the material collector system 30, the user merely applies a downward force on the latch hook cross bar 76, which pivots the latch hooks 50, 52 upwardly and rearwardly until the hook-shaped forward portions of the latch hooks are free of the upper edge 106 of the rear wall 20. Then the mounting arms 32, 34 are pivotally lowered into the position shown in FIG. 3. As noted earlier, the central portion of the cross member 36 is bent or curved rearwardly so that the material collector system 30 does not interfere with the hitch plate 22 or the hitch hole 24 therein. Thus, the hitch plate 22 and hitch hole 24 can be used for their normal intended purposes, despite the mounting of the bagger attachment with the material collector system 30. The lower swing latches 90, 92 are used to release the mounting arms 32, 34 from pivotable engagement with their respective pins 26, 28. Another notable advantage of the collector system 30 is that it can be installed and completely removed as a single integral unit. Removal and installation are quick and easy. Other than the pins 26, 28, no hardware associated with the collector mounting bracket or system 30 remains on the frame 12 after removal of the bracket 30.

Thus, it can be seen that the present invention at least satisfies its stated objectives.

In the drawings and specifications, there has been set forth a preferred embodiment invention, and although specific terms are employed, these are used in a generic and descriptive sense only and not for purposes of limitation. For instance, the spring-biased latch hooks 50, 52 of the present invention could be adapted and arranged to latch to a second set of pins protruding from the upright walls 16, 18 or another part of the frame 12 remote from the hitch hole 24. Changes in the form and proportion of parts as well as in the substitution of equivalents are contemplated as circumstances may suggest or render expedient without departing from the scope of the invention as defined in the following claims.

What is claimed is:

1. In combination, a lawn and garden tractor comprising an elongated frame with a rear portion including a pair of upright opposite side walls extending longitudinally and an upright rear wall extending transversely between the side walls; and a bagger mounting bracket comprising:

a pair of laterally spaced mounting arms each having forward and rear portions, the forward portions of the mounting arms being pivotally connected to the rear portion of the lawn and garden tractor frame along a substantially horizontal main pivot axis; and a spring biased pivotal latching means pivotally connected to the mounting arms along a latch pivot axis offset from and parallel to the main pivot axis, the latching means automatically securing the rear portions of the mounting arms to the rear portion of the tractor frame when the rear portions of the mounting arms are raised to a desired position.

2. The combination of claim 1 wherein the latching means comprises at least one latch hook pivotally mounted to the rear portion of one of the mounting arms, the latch hook having a hook-shaped forward portion adapted to capture and hold onto the rear portion of the tractor frame.

3. The combination of claim 2 wherein the spring biased latching means comprises a pair of laterally spaced latch hooks each pivotally connected to the rear portions of the mounting arms respectively and having a hook-shaped forward portion adapted to hook onto an upright portion of the tractor frame, and a pair of springs operatively connecting the latch hooks to the mounting arms so as to pivotally bias the latch hooks toward a hooked or latched position in the absence of an opposing force.

4. The combination of claim 3 wherein the springs are coiled tension springs.

5. The combination of claim 3 wherein the latch hooks are elongated and substantially flat latch plates that are identical with each other, substantially parallel to each other, and arranged so as to be remote from a hitch hole on the tractor frame.

6. The combination of claim 3 wherein the hook-shaped forward portion of the latch hook includes a slot adapted to capture a source of vertical support on the rear portion of the tractor frame, a blunt point disposed forward of the slot, a rearwardly and downwardly inclined edge beginning at the blunt point and terminating at a curved edge that leads into the slot.

7. The combination of claim 3 comprising a latch cross bar rigidly connecting the latch hooks such that the latch hooks are pivotally movable in unison, the latch cross bar connecting the latch hooks at points offset from the latch hook pivot axis so as to constitute a lever arm for applying a force in opposition to the biasing force to release the latch hooks from the latched position.

8. The combination of claim 3 comprising a lateral cross member for rigidly connecting the rear portions of the mounting arms together, the cross member including opposite ends attached to the mounting arms respectively and a rearwardly curved central portion therebetween.

9. The combination of claim 3 comprising a generally H-shaped subframe including a pair of spaced apart elongated support legs having upper and lower portions, the lower portions of the legs being rigidly attached respectively to the rear portions of the mounting arms without being attached to a hitch plate and a hitch hole on the tractor frame.

10. The combination of claim 9 comprising a rigid locking tab pivotally attached to one of the support legs for selectively pivoting into engagement with one of the latch hooks so as to prevent pivotal movement of the one of the latch hooks and secure said latch hook in the capturing or latched position.

11. The combination of claim 3 wherein the latch hooks each have a rear portion with a hole formed therethrough for slidably and rotatably receiving a pair of coaxial latch hook pivot shafts rigidly connected to the mounting arms respectively.

12. The combination of claim 3 wherein the forward portion of the mounting arm has a mounting pin opening therein adapted to receive a mounting pin disposed on the tractor frame along the main pivot axis.

13. The combination of claim 12 wherein the mounting pin opening is an elongated slot extending through the mounting arm.

14. The combination of claim 13 wherein the slot in the mounting arm extends downwardly and has a mouth or entrance thereinto at a lower edge of the mounting arm.

15. The combination of claim 14 wherein the pair of mounting arms comprises a pair of substantially flat plates arranged parallel to each other, the plates having an overall L-shaped profile and wherein an elongated portion of the L-shaped profile constitutes the forward portion of the mounting arm and a truncated portion of the L-shaped profile constitutes a rear portion of the mounting arm.

16. The combination of claim 15 comprising a pair of swing latches for retaining the mounting arms in said pivotal connection.

17. The combination of claim 16 wherein the swing latches each have a forward portion with a semi-circular slot therein adapted to register crosswise with the slot in the mounting plate so as to retain the mounting plate on a pivot pin on the rear portion of the tractor frame.

18. The combination of claim 1 wherein the rear portion of the tractor further includes a substantially horizontal hitch plate with a hitch hole therethrough attached to the rear wall and extending rearwardly thereof between the side walls; the latching means securing the mounting arms to the rear portion of the tractor frame at a location remote from the hitching plate and the hitching hole.

19. The combination of claim 18 wherein the latching means includes a pair of elongated latch hooks having hook-shaped forward portions that slidingly engage and latch to an upper edge of the rear wall of the tractor frame.

20. The combination of claim 2 wherein the latch hook includes a stop member protruding horizontally therefrom for limiting downward pivotal travel of the latch hook and positioning the latch hook such that the spring biased latch hook recoils rearwardly and upwardly upon initial engagement with the rear wall as the mounting arms are raised toward the desired position.

21. In combination, a lawn and garden tractor comprising an elongated frame with a rear portion including a pair of upright opposite side walls extending longitudinally, an upright rear wall extending transversely between the side walls, and a hitch plate extending between the side walls and rearwardly from the rear wall, the hitch plate having a vertically disposed hitch hole therethrough for receiving a clevis pin; and a bagger mounting bracket comprising:

a pair of laterally spaced mounting arms each having forward and rear portions, the forward portions of the mounting arms being pivotally attached to the rear portion of the lawn and garden tractor frame along a main pivot axis, the mounting arms being offset sufficiently from the hitch hole so as to avoid interference with the clevis pin; and a spring biased pivotal latching means pivotally connected to the mounting arms along a latch pivot axis offset from and parallel to the main pivot axis, the latching means automatically securing the rear portions of the mounting arms to the rear portion of the tractor frame when the rear portions of the mounting arms are raised to a desired position;

the latching means including at least one latch hook pivotally mounted to the rear portion of one of the mounting arms, the latch hook being offset sufficiently from the hitch hole so as to avoid interference with the clevis pin and having a hook-shaped forward portion adapted to capture and hold onto the rear portion of the tractor frame.

* * * * *